United States Patent
Aihara

(10) Patent No.: US 7,537,853 B2
(45) Date of Patent: May 26, 2009

(54) GEL ELECTROLYTE, ELECTRODE FOR FUEL CELL, AND FUEL CELL

(75) Inventor: Yuichi Aihara, Yokohama (JP)

(73) Assignee: Samsung SDI Co., Ltd., Suwon (KR)

( * ) Notice: Subject to any disclaimer, the term of this patent is extended or adjusted under 35 U.S.C. 154(b) by 871 days.

(21) Appl. No.: 11/037,231

(22) Filed: Jan. 19, 2005

(65) Prior Publication Data

US 2005/0170252 A1    Aug. 4, 2005

(30) Foreign Application Priority Data

Jan. 20, 2004    (JP)    ............... 2004-011869
Sep. 14, 2004    (KR)    ............ 10-2004-0073362

(51) Int. Cl.
*H01M 8/10*    (2006.01)
*H01M 4/86*    (2006.01)

(52) U.S. Cl. .................. 429/33; 429/42; 429/46

(58) Field of Classification Search ............. 429/33, 429/42, 46, 303
See application file for complete search history.

(56) References Cited

U.S. PATENT DOCUMENTS

| 4,425,467 | A | * | 1/1984 | Alvino et al. | ............. 524/600 |
| 4,732,637 | A | * | 3/1988 | Dettling et al. | ............ 156/295 |
| 7,115,334 | B2 | * | 10/2006 | Aihara | ....................... 429/33 |
| 2004/0149965 | A1 | * | 8/2004 | Otsuki et al. | ............... 252/500 |

FOREIGN PATENT DOCUMENTS

| JP | 2833626 | | 10/1988 |
| JP | 03-209809 | * | 9/1991 |
| JP | 05-78499 | * | 3/1993 |
| JP | 11-503262 | | 3/1999 |

* cited by examiner

*Primary Examiner*—Stephen J. Kalafut
(74) *Attorney, Agent, or Firm*—H.C. Park & Associates, PLC

(57) ABSTRACT

A gel electrolyte can have high proton conductivity even at conditions of no humidity and high temperatures and can have increased mechanical strength. The gel electrolyte can include an acid and a matrix polymer capable of being swollen by the acid. The matrix polymer can be a polyparabanic acid or a derivative thereof.

12 Claims, 1 Drawing Sheet

GEL ELECTROLYTE, ELECTRODE FOR FUEL CELL, AND FUEL CELL

BACKGROUND OF THE INVENTION

This application claims the benefit of Japanese Patent Application No. 2004-11869, filed on Jan. 20, 2004, and the benefit of Korean Patent Application No. 2004-73362, filed on Sep. 14, 2004, which are both incorporated herein in their entireties by reference.

FIELD OF THE INVENTION

The present invention relates to a gel electrolyte, an electrode for a fuel cell, and a fuel cell. More particularly the invention relates to a gel electrolyte having increased thermal resistance and proton conductivity that can be used in an electrode for fuel cells.

DESCRIPTION OF THE RELATED ART

In fuel cells, an electrolyte membrane may be required to have high proton conductivity for a long period at operating temperatures in the range of about 100 to about 300° C. and at zero humidity or at a relative humidity of less than about 50%. This requirement has been considered in the development of conventional solid polymer electrolyte fuel cells. However, in a perfluorosulfonic acid membrane, sufficient proton conductivity and output power cannot conventionally be obtained at operating temperatures in the range of about 100 to about 300° C. and a relative humidity of 50% or less.

Japanese Patent Publication No. Hei 11-503262 discloses a solid electrolyte membrane composed of polybenzimidazole impregnated with a strong acid like phosphoric acid. With this type of solid electrolyte membrane, a fuel cell can have improved resistance to oxidation and heat and can be operable at 200° C. or less.

However, the solid electrolyte membrane composed of polybenzimidazole doped with phosphoric acid contains phosphoric acid in 4-5 times by weight more than polybenzimidazole in order to obtain sufficient proton conductivity to operate a fuel cell. Such a membrane with a high concentration of phosphoric acid has lower mechanical strength and can lead to crossover of gas during installation in a fuel cell.

SUMMARY OF THE INVENTION

The present invention provides a gel electrolyte having high proton conductivity even at conditions of no humidity and high temperatures and increased mechanical strength, an electrode for a fuel cell using the gel electrolyte, and a fuel cell.

The present invention provides a gel electrolyte including an acid and a matrix polymer capable of being swollen by the acid. The matrix polymer can be polyparabanic acid or a derivative thereof.

An example of the acid is phosphoric acid. Phosphoric acid can refer to orthophosphoric acid and condensed phosphoric acid.

Polyparabanic acid is suitable as an electrolyte membrane for a fuel cell due to its high insulating property and superior thermal resistance. Also, since in view of its molecular structure the polyparabanic acid can contain a lot of phosphoric acid and form a membrane integrated with phosphoric acid without separation, the proton conductivity can be improved.

The gel electrolyte according to the present invention may further include a water-insoluble heterocyclic nitrogen containing compound.

By adding a heterocyclic nitrogen containing compound, the concentration of phosphoric acid in the gel electrolyte can be increased and the proton conductivity can further be improved. Since the heterocyclic nitrogen containing compound may be water-insoluble, even when water is produced as a product from the reaction of a fuel cell, the heterocyclic nitrogen containing compound may not discharge with water from the gel electrolyte. Thus high proton conductivity may be maintained for a longer period.

In the gel electrolyte of the present invention, the heterocyclic nitrogen containing compound may be, for example, one or more of the following: imidazoles, benzimidazoles, pyrazoles, pyridines, pyrimidines, pyrazines, pyrroles, purines, phthalocyanines, and porphyrins.

In the gel electrolyte of the present invention, preferably the proportion of the heterocyclic nitrogen containing compound to the sum of the matrix polymer and the heterocyclic nitrogen containing compound may be less than about 50% by mass. Thus, the mechanical strength of the gel electrolyte can be improved.

The present invention also provides an electrode for a fuel cell, including an electrode material and any one of the gel electrolytes described above. Thus, since the gel electrolyte with high proton conductivity is provided as a part of the electrode, protons can be easily conducted into the electrode and the internal resistance of the electrode itself can be decreased.

According to another aspect of the present invention, there is provided a fuel cell including a pair of electrodes and an electrolyte membrane interposed between the electrodes, wherein a part or the whole of the electrolyte membrane is composed of any one of the gel electrolytes as described above and the gel electrolyte is contained in a part of the electrodes.

The fuel cell can thus include a gel electrolyte with high proton conductivity. The gel electrolyte can, for example, be included in a part of the electrodes. Thus, internal impedance of the fuel cell can be decreased and current density can be increased.

According to the present invention, a gel electrolyte can have high proton conductivity even at conditions of no added humidity and high temperatures and can have very high mechanical strength. Thus an excellent electrode for a fuel cell using the gel electrolyte, and an excellent fuel cell can be provided.

DETAILED DESCRIPTION OF THE INVENTION

Figure 1:
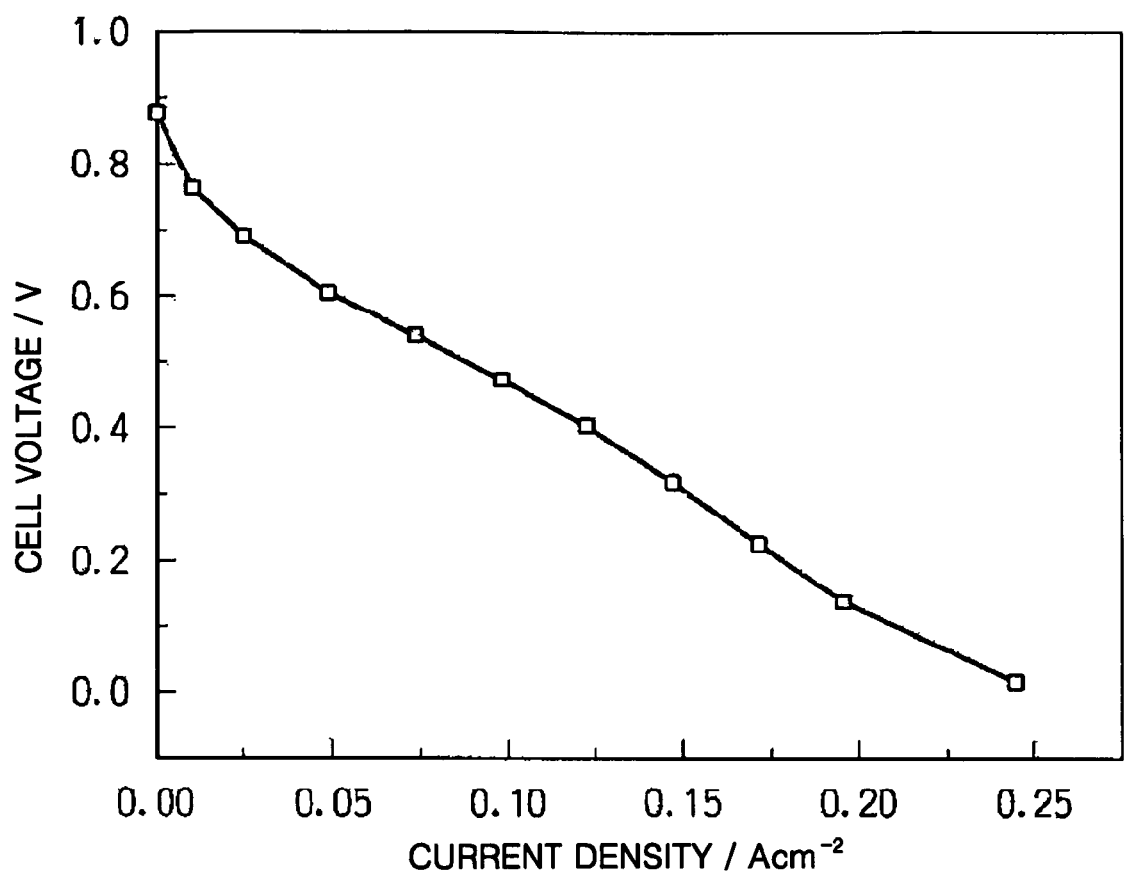
FIG. 1 is a graph illustrating the relationship between the cell voltage and the current density of a fuel cell of Example 3.

A fuel cell according to the present invention can include a hydrogen electrode, an oxygen electrode, and a gel electrolyte interposed between the hydrogen electrode and the oxygen electrode and operating at about 100 to about 300° C. A gel electrolyte according to the present invention can have proton conductivity and transport protons (hydrogen ions) generated at the hydrogen electrode to the oxygen electrode. The protons transported by the gel electrolyte electrochemically can react with oxygen ions in the oxygen electrode to produce water and simultaneously generate electrical energy.

In the fuel cell according to the present invention, the hydrogen electrode and the oxygen electrode can also include the gel electrolyte. In other words, an electrode material, such as activated carbon, and a binder for solidifying and shaping the electrode material may be contained in the hydrogen electrode and the oxygen electrode and a part or the whole of the binder may be composed of a gel electrolyte according to the present invention. Thus, protons may be easily transported between the inside and the outside of the electrode and the internal resistance of the electrode may decrease.

The gel electrolyte according to an embodiment of the present invention includes phosphoric acid and a matrix polymer capable of being swollen by the phosphoric acid. The gel electrolyte can also include a heterocyclic nitrogen containing compound. Examples of phosphoric acid include orthophosphoric acid and condensed phosphoric acid. Examples of a matrix polymer include polyparabanic acid or a derivative thereof.

The polyparabanic acid can have a structure represented by formula (1) below. In formula (1), $n_1$ represents a repeating unit and ranges from about 10 to about 10,000. X is a molecular unit depending on monomers of a raw material for synthesis. If, for example, the polyparabanic acid is synthesized using a diisocyanate as a raw material, an isocyanate group contributes to the formation of a parabanic acid ring and X is the molecular unit except for the isocyanate group. Y is O or NH.

The polyparabanic acid may be suitable as an electrolyte membrane for a fuel cell in view of its superior insulating property and thermal resistance. In view of its molecular structure the polyparabanic acid can contain a lot of phosphoric acid and can form a membrane integrated with the phosphoric acid without separation, thereby improving the proton conductivity.

Due to the presence of nitrogen in the polyparabanic acid molecule, the polyparabanic acid itself is slightly basic. The polyparabanic acid has lower basicity and is close to neutrality compared to conventional polybenzimidazoles. Thus, the interaction between polyparabanic acid and phosphoric acid is weaker than the interaction between polybenzimidazole and phosphoric acid and phosphoric acid can relatively freely move in the matrix polymer. As a result, even when using a small amount of phosphoric acid, high proton conductivity can be obtained. In addition, since the concentration of phosphoric acid can be reduced, the mechanical strength of the gel electrolyte can be improved.

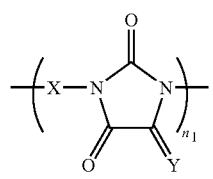
(1)

A polyparabanic acid derivative may be obtained by polymerizing a diisocyanate compound with hydrocyanic acid gas in a solvent such as dimethylformamide.

In this case, examples of the diisocyanate compound used for the synthesis of the polyparabanic acid derivative can include diphenylmethane diisocyanate (MDI), 2,4-tolylene diisocyanate (TDI), 4,4'-diphenylether diisocyanate (ODI), xylylene diisocyanate (XDI), naphthylene 1,5-diisocyanate (NDI), and tetramethylenexylylene diisocyanate (TMXDI), but are not limited thereto. The polyparabanic acid derivative can also be synthesized from dicyanoformamides and the diisocyanate or cyanoformamidylisocyanate.

Examples of a polyparabanic acid derivative obtained by polymerization include those represented by formulas (2) through (7) below. The compound of formula (2) may be synthesized from diphenylmethane diisocyanate (MDI). The compound of formula (3) may be synthesized from 2,4-tolylene diisocyanate (TDI). The compound of formula (4) may be synthesized from 4,4'-diphenylether diisocyanate (ODI). The compound of formula (5) may be synthesized from xylylene diisocyanate (XDI). The compound of formula (6) may be synthesized from naphthylene 1,5-diisocyanate (NDI). The compound of formula (7) may be synthesized from tetramethylenexylylene diisocyanate (TMXDI). In formulas (2) through (7), $n_2$ represents a repeating unit and ranges from about 10 to about 10,000.

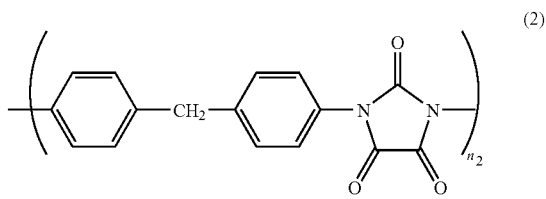
(2)

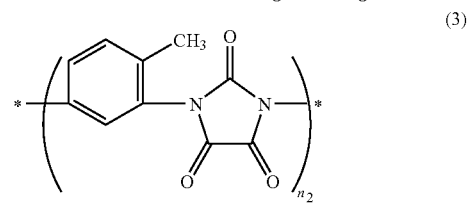
(3)

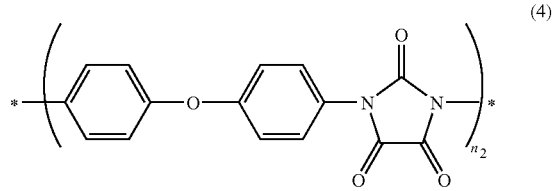
(4)

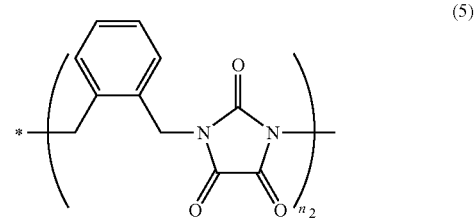
(5)

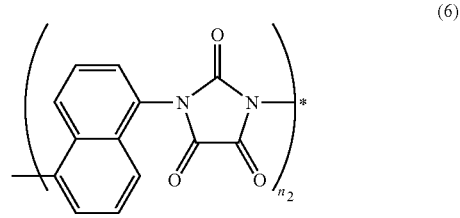
(6)

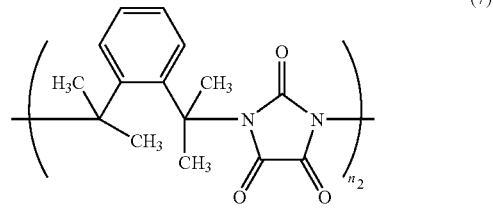
(7)

Since all the polyparabanic acid derivatives have a parabanic acid structure in their molecule, can contain a lot of phosphoric acid, and can form a membrane integrated with the phosphoric acid without separation, the proton conductivity can be improved. Further, since these derivatives can have an aromatic substituent such as a benzene substituent in the molecule, they can increase the thermal resistance even more than the original polyparabanic acid.

Since the degree of freedom of molecular design is increased depending on the selection of various diisocyanate compounds, the interaction between the polyparabanic acid derivative and phosphoric acid can be controlled.

The addition of a heterocyclic nitrogen containing compound in the matrix polymer can increase the concentration (swelling rate) of phosphoric acid in the matrix polymer, which may further improve the proton conductivity. Since polyparabanic acid and a derivative thereof have a low swelling rate by phosphoric acid, the swelling rate of polyparabanic acid can be increased by dissolving or dispersing a heterocyclic nitrogen containing compound in polyparabanic acid or a derivative thereof. This can produce a gel electrolyte having high ionic conductivity and capable of generating electricity when being used in an electrolyte for a fuel cell even at conditions of no added humidity and high temperatures.

However, if the amount of the heterocyclic nitrogen containing compound added to matrix polymer is too high, the mechanical strength may be lowered. Thus, the proportion of the heterocyclic nitrogen containing compound to the sum of the matrix polymer and the heterocyclic nitrogen containing compound may be less than about 50% by mass.

The heterocyclic nitrogen containing compound may be water-insoluble. Thus, even when water is generated as a product of the reaction of a fuel cell, the heterocyclic nitrogen containing compound may avoid being discharged with the water from a gel electrolyte, thereby retaining higher proton conductivity for a longer period.

Examples of the heterocyclic nitrogen containing compound include imidazoles, benzimidazoles, pyrazoles, pyridines, pyrimidines, pyrazines, pyrroles, purines, phthalocyanines, and porphyrins. The heterocyclic nitrogen containing compound may preferably be benzimidazoles because it has good water-insolubility.

As described above, the gel electrolyte of the present invention may have improved proton conductivity, and can increase current density and form a fuel cell having higher power output.

The present invention will now be described in greater detail with reference to the following examples. The following examples are for illustrative purposes and are not intended to limit the scope of the invention.

Preparation of Polyparabanic Acid Derivatives

Solutions containing 10% by mass of each of diphenylmethan diisocyanate (MDI), 2,4-tolylene diisocyanate (TDI), 4,4'-diphenylether diisocyanate (ODI), xylylene diisocyanate (XDI), naphthylene 1,5-diisocyanate (NDI), and tetramethylenexylylene diisocyanate (TMXDI) as a diisocyanate compound were prepared using a mixed solvent of nitrobenzene and toluene (10:1). A nitrobenzene solution containing 10% by mass of hydrogen cyanide was mixed with the previously prepared excessive diisicyanate solution in an ice bath and a saturated solution of sodium cyanide in N-methyl-2-pyrrolidinone was added drop-wise to the mixture to gradually precipitate precursor polymers.

After a reaction for about 1 hour while raising a reaction temperature to room temperature was performed, the generated precursor polymers were filtered and washed, and then cleansed with methanol. They were then dried at 40° C. for 8 hours. The precursor polymers were dispersed in strong hydrochloric acid and stirred at 60° C. for 2 hours to perform hydrolysis. In this manner, various polyparabanic acid derivatives were prepared. The polyparabanic acid derivatives synthesized from MDI, TDI, ODI, XDI, NDI and TMXDI were called PPAMDI, PPATDI, PPAODI, PPAXDI, PPANDI, and PPATMXDI, respectively.

Preparation of a Gel Electrolyte of Example 1

Then, 10% by weight of the obtained PPAMDI was dissolved in N-methylpyrrolidone to prepare a solution. The solution was coated on a glass plate with a doctor blade. The coating was pre-dried at 60° C., and then dried again at 150° C. for 15 minutes to form coating film of PPAMDI. Subsequently, the PPAMDI film on the glass plate was immersed in water and the swollen PPAMDI film was peeled away. Then, vacuum drying was performed at 60° C. and 0.1 torr. Here, a film thickness was about 30 µm.

The PPAMDI film was directly immersed in 85% phosphoric acid at room temperature. After 2 hours, the PPAMDI film was taken out and phosphoric acid on the film surface was wiped with a wiping cloth. In this manner, a gel electrolyte of Example 1 was prepared.

Preparation of Gel Electrolytes of Examples 2-18 and Comparative Example 1

In the same manner as in Example 1, 10% by weight of each of PPAMDI, PPATDI, PPAODI, PPAXDI, PPANDI, and PPATMXDI were individually dissolved in N-methylpyrrolidone to prepare solutions. Benzimidazole, imidazole, purine, and pyrazole were added to each of the solutions such that the proportion of the respective component was 10-50% by mass with respect to polyparabanic acid derivative.

These solutions were coated in the same manner as in Example 1 on glass plates with a doctor blade. The coatings were pre-dried at 60° C., and then completely dried at 150° C. for 15 minutes to form coating films of various polyparabanic acid derivatives. Subsequently, the obtained coating films on the glass plates were immersed in water and swollen films were peeled. Then, a vacuum drying was performed at 60° C. and 0.1 torr. The film thickness was about 30 µm.

The films of various polyparabanic acid derivatives were directly immersed in 85% phosphoric acid at room temperature. After 2 hours, the films were taken out and phosphoric acid on the film surface was wiped clean with a wiping cloth. In this manner, gel electrolytes of Examples 2-18 and Comparative Example 1 were prepared.

Preparation of a Gel Electrolyte of Comparative Example 2

In the same manner as in Example 1, polybenzimidazole was dissolved in N-methylpyrrolidone to prepare a solution. Subsequently, coating, pre-drying, drying, and swelling by immersion in water were performed to obtain polybenzimidazole film with a thickness of 30 µm.

The polybenzimidazole film was directly immersed in 85% phosphoric acid at room temperature. After 2 hours, the film was taken out and phosphoric acid on the film surface was wiped clean with a wiping cloth. In this manner, a gel electrolyte of Comparative Example 2 was prepared.

[Evaluation]

Swelling Rate and Proton Conductivity of Gel Electrolytes

The swelling rate by phosphoric acid as well as the proton conductivity were investigated for the gel electrolytes of Examples 1-18 and Comparative Examples 1 and 2.

The swelling rate by phosphoric acid was calculated from the mass (M1) of the polyparabanic acid derivative film before immersing it in phosphoric acid and the mass (M2) of gel electrolyte after immersing it in phosphoric acid. The swelling rate (%) is obtained from an equation, swelling rate (%)=M2/M1×100. The results were shown in Table 1.

To determine of the proton conductivity in low humidity condition close to no humidity, the gel electrolyte was pierced in a ring shape with a diameter of 13 mm and interposed between Pt blocking electrodes. The resulting cell structure was left at 70° C. for 1 hour and the resistance between electrodes was measured by an AC impedance method. The results were shown in Table 1.

In Table 1, the types of matrix polymer (polyparabanic acid derivative), types of heterocyclic nitrogen containing compound, and the proportion of the heterocyclic nitrogen containing compound to the sum of the matrix polymer and the heterocyclic nitrogen containing compound of Examples 1-18 and Comparative Example 1 and 2 are also shown.

the mechanical strength of the membrane may also relatively improve because the concentration of phosphoric acid is lower.

Performance of a Fuel Cell

Regarding a fuel cell of Example 3, a laminate composed of an electrode including an activated carbon as an electrode material and a gel electrolyte interposed between carbon separators was tested for generation of electricity was performed using hydrogen as an anode gas and oxygen as a cathode gas. The temperature of the cell was 130° C. and the supply rate of hydrogen and oxygen were each 100 ml/min. Specific humidity of the supplied gas was not measured. The electrode area of Example 3 was 7.84 $cm^2$. FIG. 1 illustrates the relationship between voltage and current density of the fuel cell.

TABLE 1

| | Polyparabanic acid derivative | Heterocyclic nitrogen containing compound | Proportion (%) | Swelling rate (%) | Conductivity (mScm$^{-1}$) |
|---|---|---|---|---|---|
| Example 1 | PPAMDI | — | — | 124 | 0.11 |
| Example 2 | PPAMDI | Benzimidazole | 10 | 135 | 0.20 |
| Example 3 | PPAMDI | Benzimidazole | 20 | 153 | 2.35 |
| Example 4 | PPAMDI | Benzimidazole | 30 | 167 | 5.12 |
| Example 5 | PPAMDI | Benzimidazole | 40 | 186 | 7.60 |
| Comparative Example 1 | PPAMDI | Benzimidazole | 50 | Not measurable | Not measurable |
| Example 6 | PPAMDI | Imidazole | 20 | 129 | 0.14 |
| Example 7 | PPAMDI | Purine | 10 | 130 | 0.13 |
| Example 8 | PPAMDI | Pyrazole | 10 | 132 | 0.18 |
| Example 9 | PPATDI | Benzimidazole | 10 | 136 | 0.99 |
| Example 10 | PPATDI | Imidazole | 10 | 130 | 0.34 |
| Example 11 | PPAODI | Benzimidazole | 10 | 140 | 1.5 |
| Example 12 | PPAODI | Imidazole | 10 | 132 | 0.78 |
| Example 13 | PPAXDI | Benzimidazole | 10 | 137 | 0.88 |
| Example 14 | PPAXDI | Imidazole | 10 | 130 | 0.22 |
| Example 15 | PPANDI | Benzimidazole | 10 | 137 | 1.20 |
| Example 16 | PPANDI | Imidazole | 10 | 126 | 0.43 |
| Example 17 | PPATMXDI | Benzimidazole | 10 | 132 | 0.89 |
| Example 18 | PPATMXDI | Imidazole | 10 | 128 | 0.23 |
| Comparative Example 2 | Polybenzimidazole | — | — | 120 | 0.01 or less |

As shown in Table 1, regarding Examples 1-5 and Comparative Example 1 in which the proportion of benzimidazole added as the heterocyclic nitrogen containing compound was adjusted in a range of 0-50%, both the swelling rate by phosphoric acid and the proton conductivity increased as the proportion of benzimidazole added was increased. Although Example 1 without the addition of benzimidazole has slightly low proton conductivity, the proton conductivity of Example 1 is sufficient for an electrolyte for a fuel cell. Meanwhile, Comparative Example 1 with 50% benzimidazole displayed lowered mechanical strength. Lower mechanical strength makes forming a uniform film difficult.

Examples 6-18 had relatively high proton conductivities.

The gel electrolyte of Comparative Example 2 displayed a similar swelling rate by phosphoric acid to other Examples, but had significantly lowered proton conductivity. This is because the transporting of protons was inhibited by strong interaction between phosphoric acid and polybenzimidazole due to relatively strong basicity of polybenzimidazole—a matrix polymer.

Thus, the gel electrolytes according to the present invention can have high proton conductivity even at relatively lower concentrations of phosphoric acid. It is apparent that As illustrated in FIG. 1, the generation of electricity was possible in Example 3 until the current density was 0.25 A/$cm^2$. The fuel cell of Example 3 had low inner resistance due to high proton conductivity of the gel electrolyte, and thereby had a higher power output.

While the present invention has been particularly shown and described with reference to exemplary embodiments thereof, various changes may be made to these embodiments without departing from the scope of the invention.

What is claimed is:

1. A gel electrolyte, comprising:
   phosphoric acid, and
   a matrix polymer capable of being swollen by the phosphoric acid,
   wherein the matrix polymer comprises polyparabanic acid or a derivative thereof.

2. The gel electrolyte of claim 1, further comprising a water-insoluble heterocyclic nitrogen containing compound in the matrix polymer.

3. The gel electrolyte of claim 1, wherein the heterocyclic nitrogen containing compound comprises at least any one selected from the group of imidazoles, benzimidazoles, pyrazoles, pyridines, pyrimidines, pyrazines, pyrroles, purines, phthalocyanines, and porphyrins.

4. The gel electrolyte of claim 2, wherein the proportion of the heterocyclic nitrogen containing compound to the sum of the matrix polymer and the heterocyclic nitrogen containing compound is less than about 50% by mass.

5. An electrode for a fuel cell, comprising:
   an electrode material and gel electrolyte, wherein the gel electrolyte comprises:
   an acid, and
   a matrix polymer capable of being swollen by the acid,
   wherein the matrix polymer comprises polyparabanic acid or a derivative thereof.

6. The electrode of claim 5, further comprising a water-insoluble heterocyclic nitrogen containing compound in the matrix polymer.

7. The electrode of claim 6, wherein the heterocyclic nitrogen containing compound comprises at least any one selected from the group of imidazoles, benzimidazoles, pyrazoles, pyridines, pyrimidines, pyrazines, pyrroles, purines, phthalocyanines, and porphyrins.

8. The electrode of claim 6, wherein the proportion of the heterocyclic nitrogen containing compound to the sum of the matrix polymer and the heterocyclic nitrogen containing compound is less than about 50% by mass.

9. A fuel cell, comprising:
   a pair of electrodes and an electrolyte membrane interposed between the electrodes,
   wherein a part up to the whole of the electrolyte membrane comprises a gel electrolyte and the gel electrolyte is contained in a part of the electrodes, and
   wherein the gel electrolyte comprises:
   an acid, and
   a matrix polymer capable of being swollen by the acid,
   wherein the matrix polymer comprises polyparabanic acid or a derivative thereof.

10. The fuel cell of claim 9, further comprising a water-insoluble heterocyclic nitrogen containing compound in the matrix polymer.

11. The fuel cell of claim 10, wherein the heterocyclic nitrogen containing compound comprises at least any one selected from the group of imidazoles, benzimidazoles, pyrazoles, pyridines, pyrimidines, pyrazines, pyrroles, purines, phthalocyanines, and porphyrins.

12. The fuel cell of claim 10, wherein the proportion of the heterocyclic nitrogen containing compound to the sum of the matrix polymer and the heterocyclic nitrogen containing compound is less than about 50% by mass.

* * * * *